United States Patent
Yang

(10) Patent No.: US 6,781,828 B2
(45) Date of Patent: Aug. 24, 2004

(54) DISPLAY HAVING A DETACHABLE TV CARD

(75) Inventor: Shain-Li Yang, Taipei (TW)

(73) Assignee: Alpha WU, Chung Ho (TW)

( * ) Notice: Subject to any disclaimer, the term of this patent is extended or adjusted under 35 U.S.C. 154(b) by 0 days.

(21) Appl. No.: 10/314,305

(22) Filed: Dec. 9, 2002

(65) Prior Publication Data

US 2004/0109287 A1 Jun. 10, 2004

(51) Int. Cl.[7] ............................................... H05K 5/00
(52) U.S. Cl. .......................... 361/686; 361/727; 361/737; 439/59
(58) Field of Search ............................... 361/681–683, 361/686, 727, 737, 756, 769, 776, 760; 345/905; 439/428.1, 945, 59

(56) References Cited

U.S. PATENT DOCUMENTS 5,315,478 A * 5/1994 Cadwell et al. ............. 361/684
6,625,016 B2 * 9/2003 Glusing et al. ............. 361/686
2002/0141147 A1 * 10/2002 Ando .......................... 361/684

* cited by examiner

Primary Examiner—Darren Schuberg
Assistant Examiner—Anthony Q. Edwards
(74) Attorney, Agent, or Firm—Leong C. Lei

(57) ABSTRACT

A display having a detachable TV card is disclosed. The display is provided with an insertion slot and the circuit board of the display is provided with a fixing slot seat protruded to the bottom section of the insertion slot and the two lateral sides of the insertion slots are provided with a sliding slot, and at the slot opening of the insertion slot, two fixing holes are provided; the two lateral sides of the TV card are engaged to the slot, and one end of the TV card is provided with a connection portion for the mounting onto the fixing slot seat, and one end of the TV card is provided with a fixing card and a through hole is provided to correspond to the fixing hole, the inner side of the fixing plate is provided with two buffering fastener with elasticity, one end of the buffering fastener is provided with a pressing section extended to urge at the bottom section of the sliding slot; and two fixing pins pass through the through holes and the fixing holes and fix the fixing plate to the fixing seat plate.

1 Claim, 4 Drawing Sheets

DISPLAY HAVING A DETACHABLE TV CARD

BACKGROUND OF THE INVENTION (a) Technical Field of the Invention

The present invention relates to a display, and in particular, to a display which can be manufactured at a lower cost, easily operated, and having excellent reception with a detachable TV card.

(b) Description of the Prior Art

Taiwanese Patent No. 322338 discloses an extension box for computer monitor, which provides extension for TV, video conference and digital processing interface. However, the extension box has the following drawbacks:

(1) High production cost and the performance is poor.

Due to the fact that conventional display needs to be compatible with various types of interface, a micro processor, similar to that having the function of a computer, is mounted. Therefore the cost of production is increased and the effect of processing by the processor is poor.

(2) Reception of Video signal is poor.

The signals received by the display have to pass to the interface ant then to the microprocessor of the monitor, due to multi transmission from one component to another, the video signal is poor.

(3) Structure complicated and the size is large.

Due to the presence of an extension box within the display, the structure of the display is complicated and the size is comparative large.

(4) Inconvenient in application.

There is a cover to cover the slot at the housing to insert the interface, when an aerial is to be connected, the cover cannot be placed back to its original position. This will collect dust or impurities after a prolong period of use.

(5) High rate of damages.

As the cover of the extension box is frequently opened to change the interface, it is very frequently the power has not been cut off before the card is changed. This will sometimes cause a strong potential and short circuit is frequently occurred and the rate of malfunction is increased. Accordingly, it is an object of the present invention to mitigate the above drawbacks by providing a display having a detachable TV card.

SUMMARY OF THE INVENTION

Accordingly, it is an object of the present invention to provide a display having a detachable TV card, characterized in that the display is provided with an insertion slot and the circuit board of the display is provided with a fixing slot seat protruded to the bottom section of the insertion slot and the two lateral sides of the insertion slots are provided with a sliding slot, and at the slot opening of the insertion slot, two fixing holes are provided, the two lateral sides of the TV card are engaged to the slot, and one end of the TV card is provided with a connection portion for the mounting onto the fixing slot seat, and one end of the TV card is provided with a fixing card and a through hole is provided to correspond to the fixing hole, the inner side of the fixing plate is provided with two buffering fastener with elasticity, one end of the buffering fastener is provided with a pressing section extended to urge at the bottom section of the sliding slot; and two fixing pins pass through the through holes and the fixing holes and fix the fixing plate to the fixing seat plate.

Yet another object of the present invention is to provide a display having a detachable TV card, wherein the fixing plate is provided with an aerial connector for the connection of an aerial and cable for cable TV.

A further object of the present invention is to provide a display having a detachable TV card wherein the TV card is provided with a plurality of circuits and electronic components for receiving and converting signals of the aerial and TV cable.

Still another object of the present invention is to provide a display having a detachable TV card wherein the buffering fastener is a plate body with a pair of dual L-shaped bending and one end of the plate body is fixed to the fixing plate and the other end is mounted onto the pressing section.

The foregoing object and summary provide only a brief introduction to the present invention. To fullly appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

The following descriptions are of exemplary embodiments only, and are not intended to limit the scope, applicability or configuration of the invention any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
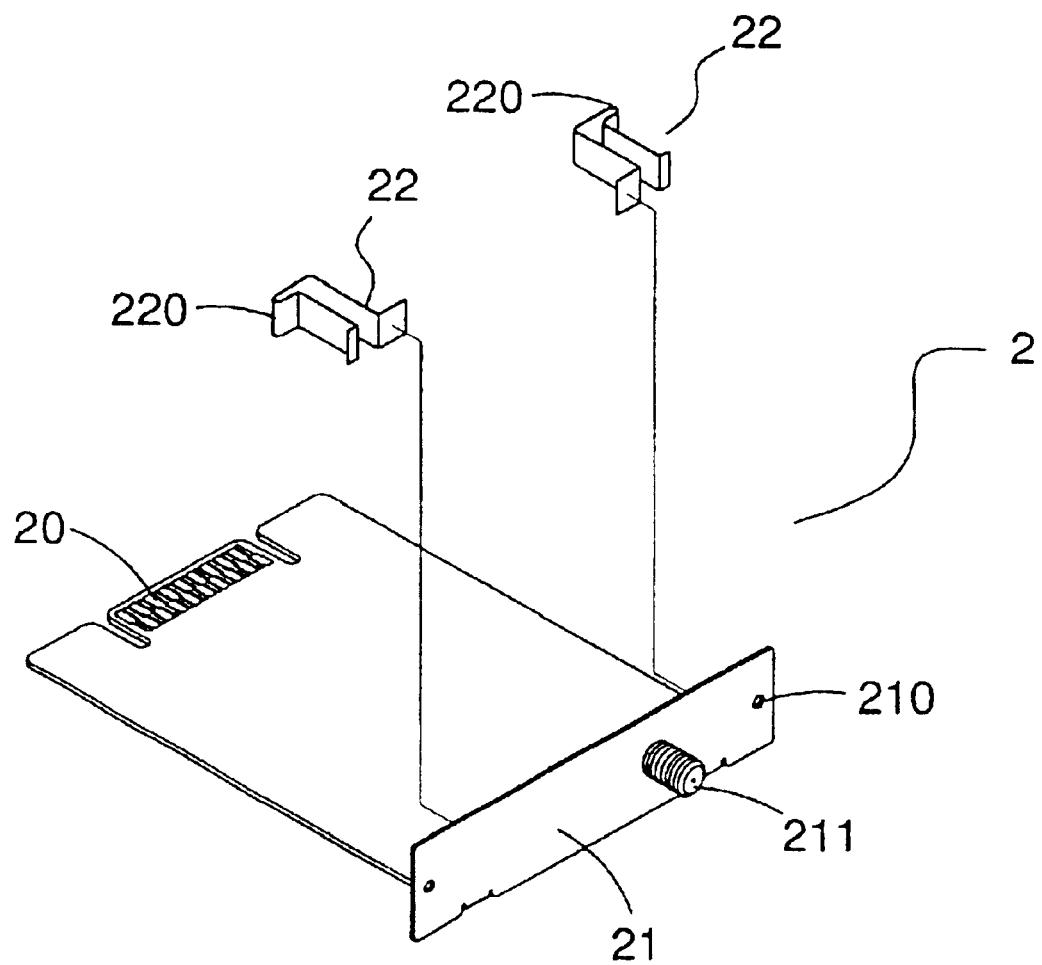
FIG. 1 is a perspective exploded view of a TV card in accordance with the present invention.
Figure 2:
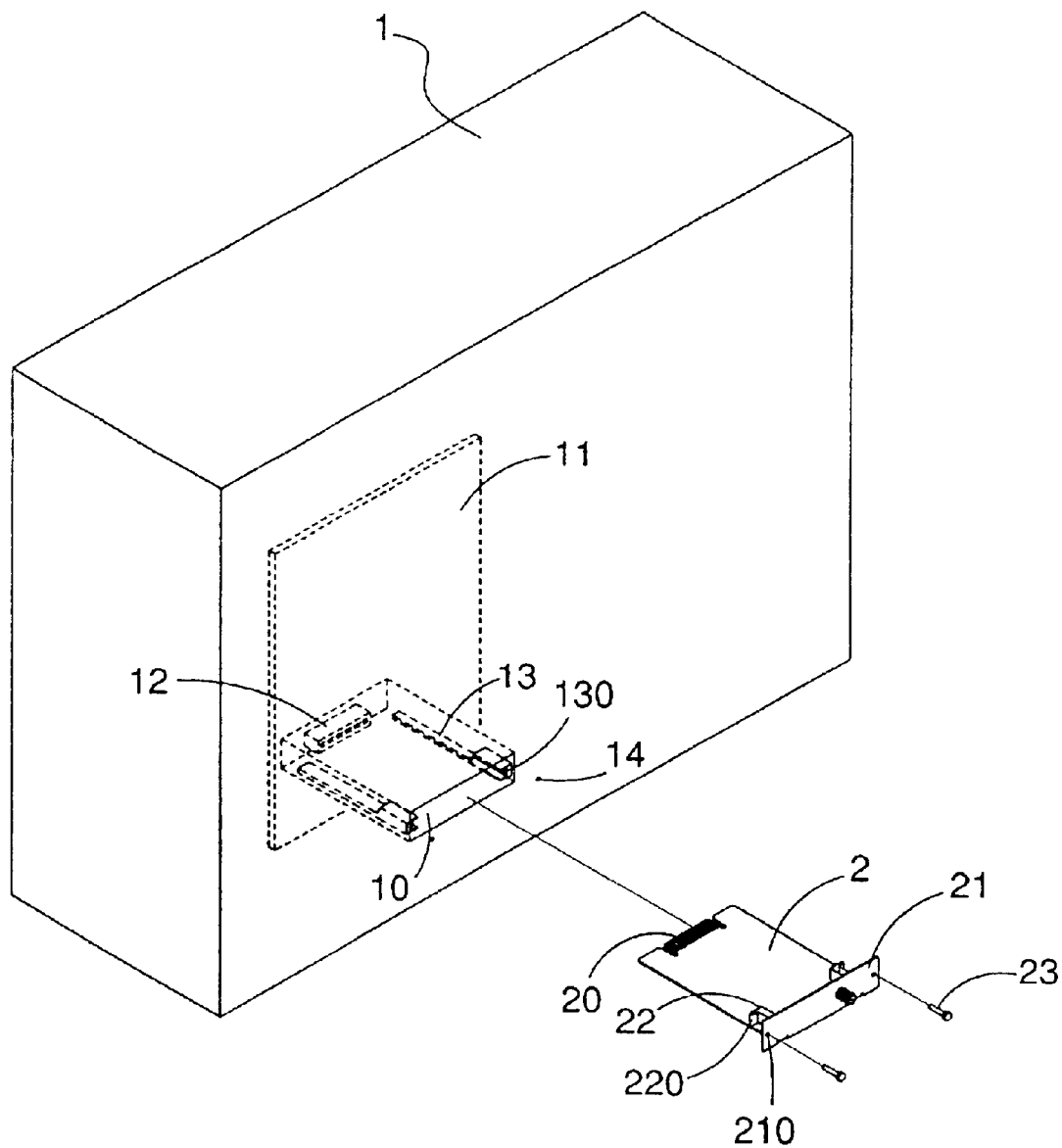
FIG. 2 is a perspective view of a TV card in accordance with the present invention.

Referring to FIGS. 1 and 2, there is shown a monitor having detachable TV card. The monitor 1 can be connected to computer and the monitor can be mounted with a TV card 2 to provide the function of a TV.

The display is provided with an insertion slot and the circuit board of the display is provided with a fixing slot seat protruded to the bottom section of the insertion slot and the two lateral sides of the insertion slots are provided with a sliding slot, and at the slot opening of the insertion slot, two fixing holes are provided; the two lateral sides of the TV card are engaged to the slot, and one end of the TV card is provided with a connection portion for the mounting onto the fixing slot seat, and one end of the TV card is provided with a fixing card and a through hole is provided to correspond to the fixing hole, the inner side of the fixing plate is provided with two buffering fastener with elasticity, one end of the buffering fastener is provided with a pressing section extended to urge at the bottom section of the sliding slot; and two fixing pins pass through the through holes and the fixing holes and fix the fixing plate to the fixing seat plate.

Figure 3:
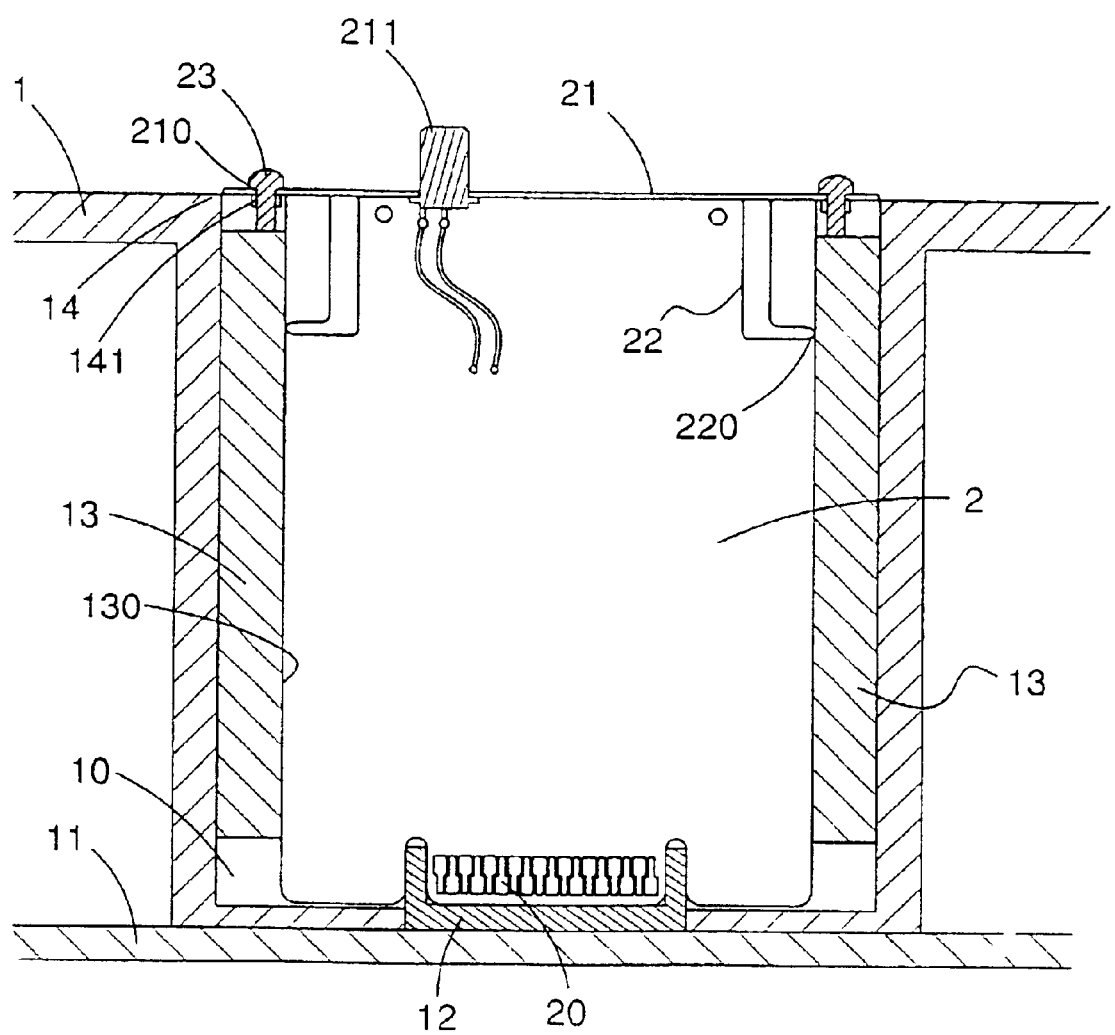
FIG. 3 is a sectional view of the combination in accordance with the present invention.
Figure 4:
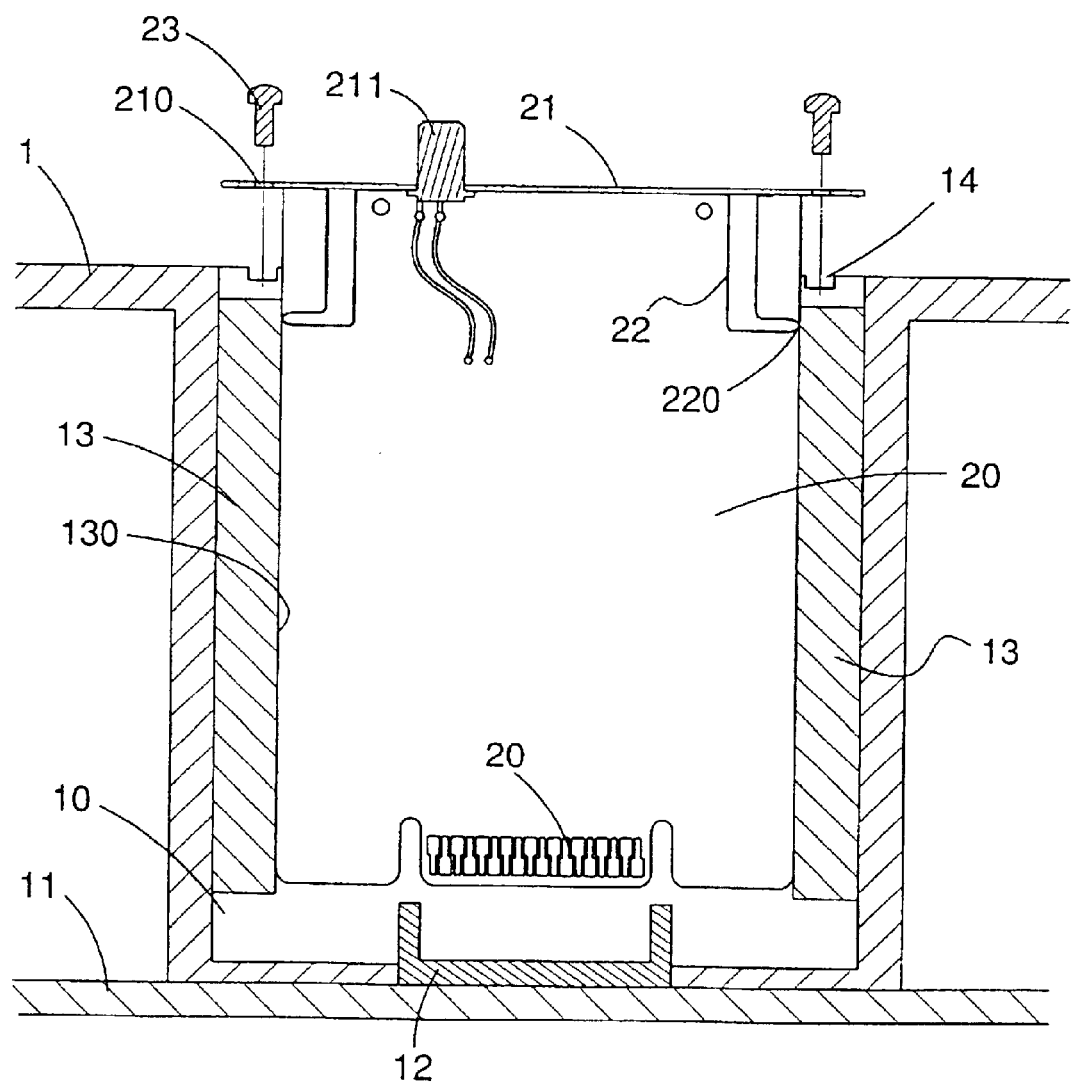
FIG. 4 is a schematic view showing the dismantling and insertion of TV card in accordance with the present invention.

Referring to FIGS. 3 and 4, when a TV card 2 is inserted into the insertion slot 10 of the display 1, by the guiding of the sliding slot 130, the TV card 2 causes one side of the gold finger 21 to be inserted to the fixing slot seat 12 at.

Thus, by means of a fixing pin 23 to pass through the through hole 210 and a fixing hole 14, the TV card 2 is fixed to the insertion slot 10. When the TV card 2 is withdrawn, the gold finger will dislocate from the fixing slot seat 12 and at the same time, the pressing portion 220 of the buffering fastener 22 at the two lateral sides of the TV card 2 will produce a frictional force with the bottom section of the sliding slot 130 so as to buffer the pulling force of the TV card 2.

In accordance with the present invention, the advantages are as follows:

(1) Low production cost. Due to the fact that the display I can be connected to a computer and when a TV card 2 is mounted to the display, it can be used as a TV.

(2) Excellent reception. The TV card 2 is directly mounted to the fixing slot seat 12 of the circuit board 11 of the display 1. Therefore, the signal received by the TV card 2 can be directly broadcasted without going through any connector. Therefore no signal loss or attenuation and the quality of reception is excellent.

(3) Simple structure and small size. As only one insertion slot 10 is provided on the display 1. The bottom section of the insertion slot 10 is a fixing slot seat 12 for insertion of a TV card 2. The slot opening of the insertion slot 10 is provided with a fixing hole 14 for the positioning of the TV card 2. Therefore, the structure is simple and the installation is convenient. The size of the display is greatly reduced as only a TV card 2 is mounted thereto.

(4) Convenient operation. One lateral side of the insertion slot can cover the slot opening of the insertion slot 10, and the TV card 2 can be used for the mounting aerial connector 11 mounted with the cable for aerial and cable TV. Therefore, the use of the display I is simple.

(5) The installation is secured and the detachment is convenient.

The gold finger 20 of the TV card 2 and the two buffering fastener 22 form into a stable configuration. The top pressing portion 22 of the two buffering fastener 22 is provided with elasticity. When the TV card 2 is withdrawn, a Frictional force is produced at the sliding slot 130 so that the withdrawing of the gold finger 20 from the fixing slot seat 12 reduces the initial force, avoiding damage to the TV card 2.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those sidled in the art without departing in any way from the spirit of the present invention.

I claim:

1. A display having a detachable TV card wherein the display comprises an insertion slot and a circuit board of the display provided with a fixing slot seat protruded to a bottom section of the insertion slot and two lateral sides of the insertion slot provided with a sliding slot, and two fixing holes at a slot opening fixing seat plate of the insertion slot; two lateral sides of the TV card engaged to the insertion slot, and one end of the TV card provided with a connection portion for mounting onto the fixing slot seat and one end of the TV card provided with a fixing plate and through holes provided to correspond to the fixing holes, an inner side of the fixing plate provided with two elastic buffering fasteners, one end of each buffering fastener provided with a pressing section extended to urge at a bottom section of the sliding slot; and two fixing pins pass through the through holes and the fixing holes to fix the fixing plate to the slot opening fixing seat plate; the fixing plate provided with an aerial connector for connection of an aerial and cable for cable TV; the TV card also provided with a plurality of circuits and electronic components for receiving and converting signals of the aerial and TV cable; the buffering fasteners comprising a plate body having a pair of dual L-shaped bending portions and one end of the plate body fixed to the fixing plate and the other end mounted onto the pressing section.

* * * * *